(12) United States Patent
Goldie

(10) Patent No.: US 6,824,160 B2
(45) Date of Patent: Nov. 30, 2004

(54) JACK DOLLY

(76) Inventor: Lowell D. Goldie, 5218 Cypress La., Naples, FL (US) 34113

( * ) Notice: Subject to any disclaimer, the term of this patent is extended or adjusted under 35 U.S.C. 154(b) by 179 days.

(21) Appl. No.: 10/334,995

(22) Filed: Dec. 30, 2002

(65) Prior Publication Data

US 2003/0178814 A1 Sep. 25, 2003

Related U.S. Application Data

(60) Provisional application No. 60/365,802, filed on Mar. 21, 2002.

(51) Int. Cl.$^7$ ................................................ B62B 3/04
(52) U.S. Cl. .................. 280/641; 280/79.11; 280/47.34
(58) Field of Search ................................ 280/38, 43.11, 280/43.12, 43.17, 47.34, 79.2, 79.11, 79.4, 641, 651; 293/111.1; 414/400–402, 426, 428, 429, 430, 444, 458, 490, 540

(56) References Cited

U.S. PATENT DOCUMENTS

| | | | | |
|---|---|---|---|---|
| 637,650 A | * | 11/1899 | Northrop | .................. 280/79.11 |
| 2,198,438 A | * | 4/1940 | Knapp | .......................... 414/430 |
| 2,226,521 A | * | 12/1940 | McNamara | .................. 414/430 |
| 2,491,318 A | * | 12/1949 | Tomlinson et al. | .......... 414/430 |
| 2,696,928 A | * | 12/1954 | Faircloth et al. | ............. 414/469 |
| 3,415,401 A | * | 12/1968 | Olsson | ......................... 414/469 |
| 3,583,723 A | * | 6/1971 | Nowell et al. | .............. 280/79.4 |
| 3,643,898 A | * | 2/1972 | Whitener et al. | .............. 244/50 |
| 3,720,422 A | * | 3/1973 | Nelson | .......................... 280/35 |
| 4,696,484 A | * | 9/1987 | Casey | ....................... 280/43.16 |
| 4,900,215 A | * | 2/1990 | Nowell | ......................... 414/428 |
| 4,913,459 A | * | 4/1990 | Smeitink | ..................... 280/641 |
| 5,228,651 A | | 7/1993 | Warner | |
| 5,716,061 A | | 2/1998 | Sloan et al. | |
| 5,826,857 A | | 10/1998 | Brack et al. | |
| 5,941,675 A | * | 8/1999 | Orr | ............................. 414/428 |

* cited by examiner

Primary Examiner—Christopher P. Ellis
Assistant Examiner—Bridget Avery
(74) Attorney, Agent, or Firm—Edward M. Livingston

(57) ABSTRACT

A dolly (10) for transporting a hydraulic vehicle jack (50) has a pair of elongate front arm members (12a, b) pivotally attached to cooperating ends of a pair of elongate rear arm members (34a, b) by a rod (30). The front arm members are mounted on wheels (22a, b) disposed pivotally to collars (13a, b) on the front arm member. An axle (42a, b) with a wheel (44a, b) is rotatingly disposed each rear arm member rods (40a, b) are attached to an inside surface of the front arm members and rear arm members. The dolly is used to move vehicle jacks that have been modified to have an aperture (62) and mounting rods (64, 66, 68) attached to outside walls thereof. The modified jack is then aligned between the arm members of the dolly so that the rods on the front arm members of the dolly are inserted into the aperture on the jack. Then, springs (28, 70, 72) are secured between the rods on the dolly to the rods on the jack. In this configuration, the handle (54) of the jack can be manipulated to transport the jack to a desired location. To further aid movement of the jack a pin can be placed through an aperture at a distal end of the handle of the jack and secured to the hitch of a vehicle for towing.

4 Claims, 3 Drawing Sheets

JACK DOLLY

CROSS-REFERENCE TO RELATED APPLICATION

This application claims the benefit of U.S. Provisional Application No. 60/365,802, filed Mar. 21, 2002.

BACKGROUND OF THE INVENTION

This invention relates to the field of jack dollies used for transporting hydraulic automobile jacks and more particularly, a jack dolly having four pivotally connected and cooperating arm members with at least four wheels for transporting a hydraulic automobile jack from a first location to a second location.

Hydraulic automobile jacks are typically comprised of an elongate rectangular body with a pair of front wheels attached to a first end thereof and a pair of rear wheels attached to an opposing end thereof. An elongate cylindrical handle is attached to an internal hydraulic lift mechanism, which, upon pumping of the handle, raises a support plate from the rectangular body. A valve can be actuated to release the internal pressure generated by the pumping of the handle to lower the support plate. The front wheels are attached to the body by dedicated axles and thus rotate around the axles. The rear wheels comprise a caster assembly, wherein a bracket is pivotally attached at a first end to flanges located on opposing sidewalls of the jack body. The wheels rotate about an axle, which is disposed through a second end of said bracket. As such, the rotation of the front wheels allows the jack to be moved forward or backward in a straight linear motion but prevents the front end of the jack from being moved sideways. On the other hand, the rear wheels allow the rear end of the jack at which the handle is attached to be pivoted about the front wheels or otherwise to be moved in an arcuate motion. In this manner, the motion of the front end of the jack, which bears the full weight of a motor vehicle when supporting said vehicle, is restricted, thereby providing a degree of safety.

As the jack is designed to function as a stable lifting and support mechanism for motor vehicles, the front and rear wheels are fabricated of metal into a relatively small diameter, which provides the necessary strength and stability so that the wheels will not collapse or buckle under the weight of a motor vehicle. However, the features that allow the wheels of the jack to safely support the jack and a motor vehicle lifted by said jack prevent the jack from being easily transported over relatively long distances, such as across the floor of a shop, over a road or parking lot, or into a transport vehicle. The metal construction and relatively small diameter of the wheels, for instance, makes the jack susceptible to becoming stuck in small cavities, depressions, or ruts in the shop floor, road, or parking lot or the movement of the jack is obstructed by small stones, pebbles, or uneven or raised floor, road or parking lot sections. This situation is further exacerbated by the limited mobility of the jack due to the means of attaching the front and rear wheels as described earlier and the relatively heavy weight of a typical hydraulic automobile jack What is needed then to overcome the difficulties and limitations of transporting a hydraulic automobile jack is the provision of a jack dolly onto which a hydraulic automobile jack can be releasably secured and then transported, moved, or otherwise wheeled about with significantly less effort and difficulty than that required for transport of said jack without said jack dolly.

Numerous designs for hydraulic automobile jack dollies and stands have been provided in the prior art. Even though these designs may be suitable for the specific individual purposes to which they address, they would not be suitable for the purposes of the present invention. These designs are exemplified by U.S. Pat. No. 5,462,257, issued to Trowbridge on Oct. 31, 1995; and U.S. Pat. No. 6,199,826, issued to Nix on Mar. 13, 2001 and are intended primarily to allow a hydraulic automobile jack to be moved more efficiently while said jack is already positioned under a motor vehicle.

As such, it way be appreciated that there is a continuing need for a new and improved jack dolly that can be used to transport a hydraulic automobile jack over the floor of a shop, over a road or parking lot surface, or into a transport vehicle. In these respects, the present invention substantially departs from the conventional concepts and designs of the prior art, and in so doing provides an apparatus that substantially fulfills this need. Additionally, the prior patents and commercial techniques do not suggest the present inventive combination of component elements arranged and configured as disclosed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

The primary object of the present invention and advantages of the present invention is to provide a jack dolly onto which a hydraulic vehicle jack can be releasably secured and then transported, moved, or otherwise wheeled about with significantly less effort and difficulty than that required for transport of said jack.

A further object of the present invention to provide a low cost, easy to manufacture, and easy to market jack dolly for hydraulic vehicle jacks.

An even further object of the present invention is to provide an easy to use and versatile jack dolly for hydraulic automobile jacks.

The present invention fulfills the above and other objects by providing a jack dolly for transporting a hydraulic vehicle jack over the floor of a shop, over a road or parking lot surface, or into a transport vehicle. The jack dolly is comprised of two elongate rectangular front arm members and two elongate rectangular rear arm members with each front arm member pivotally attached at one end thereof to a cooperating end of a rear arm member by a rod that is disposed in apertures located at cooperating ends of the front and rear arm members. A cylindrical collar is located at the end of each front arm member opposite to the end attached to a rear arm member. A wheel fork is disposed in pivotal engagement within said collar, and an axle with a wheel rotatingly disposed on said axle is affixed to the lower end of the fork. A rod is medially attached in perpendicular relation to the inside surface of each front arm member, and springs are secured at one end thereof to said rod.

An axle with a wheel rotatingly disposed on said axle extends from the end of each rear arm member opposite to the end attached to a cooperating front arm member. A rectangular plate with rod affixed thereto is attached to the inside surface of each rear arm member adjacent to the axle thereof.

The jack dolly of the present invention receives and supports above a ground or floor support surface a conventional hydraulic vehicle jack, which is modified to be releasably secured to the jack dolly. The jack modification is comprised of a bore that is located at the top of the jack body and extends through the body of said jack and six rods attached in perpendicular relation to the exterior surface of opposed lateral sidewalls of the body of the jack. Three rods are attached to each sidewall.

The hydraulic vehicle jack is attached to the jack dolly by aligning the jack between the arm members and inserting the rod through the bore of the jack and through cooperating apertures at the ends of the front and rear arm members. Four springs are attached at a first end to the rods located on the front arm members and at a second end to rods located at the rear of the body of the jack. Two springs are attached at a first end to the rods extending from the plates attached to the rear arm members and at a second end to rods located at the middle of the jack body, and two springs are attached at a first end to said rods extending from the plates attached to the rear arm members and at a second end to the front rods located at the front of the jack body.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

The foregoing and other objects, features and advantages of the invention will become more fully understood from the following description of the preferred embodiment of the invention as illustrated in the accompanying drawings in which like reference characters refer to the same parts throughout different views. The drawings are not necessarily to scale, emphasis instead being placed upon illustrating the principles of the invention.

DESCRIPTION OF THE PREFERRED EMBODIMENTS

Figure 1:
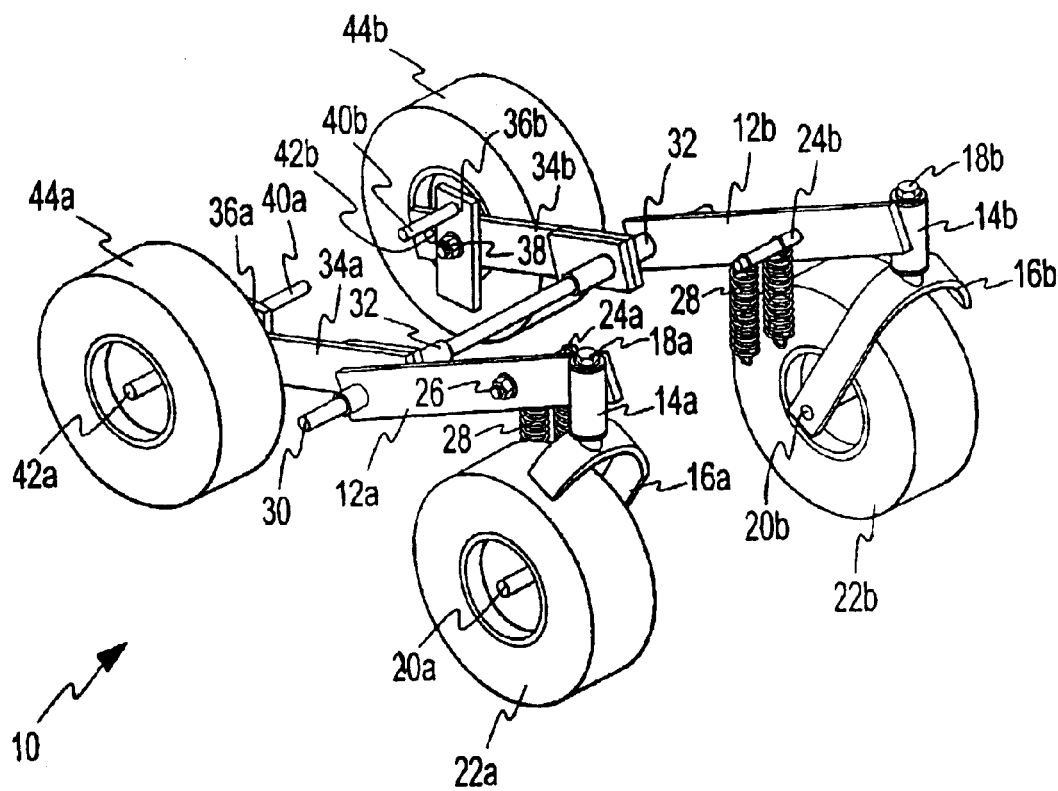
FIG. 1 is a perspective view of a dolly with the present invention.
Figure 2:
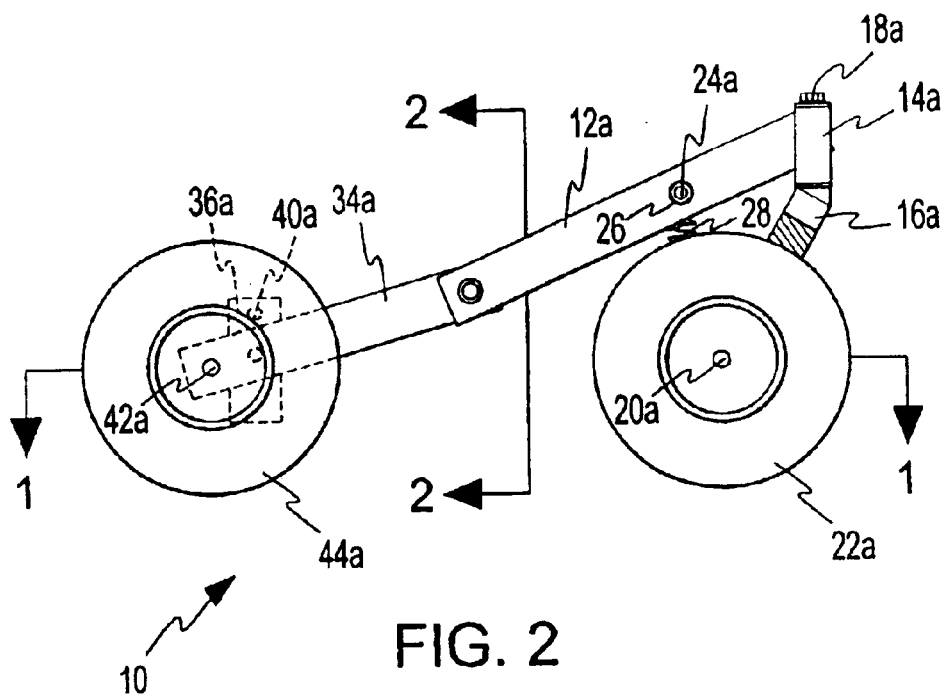
FIG. 2 is a side elevation view of a dolly the present invention.
Figure 3:
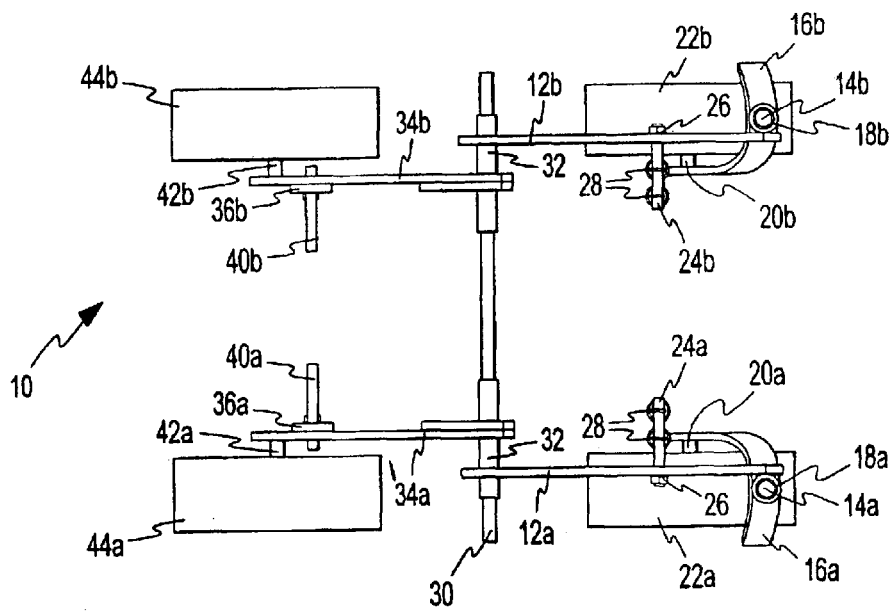
FIG. 3 is a top plan view of a dolly of the present invention along line 1—1 of FIG. 2.
Figure 4:
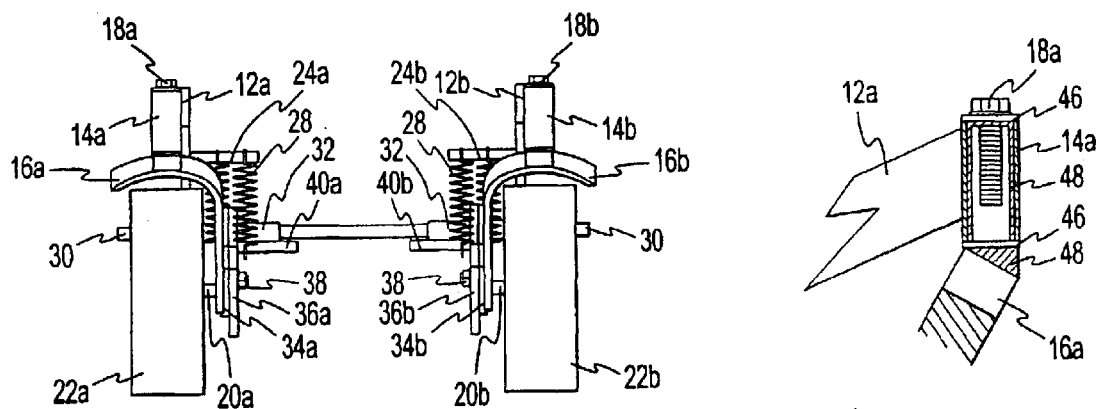
FIG. 4 is a front elevation view of the jack dolly of the present invention along line 2—2 of FIG. 2.

For purposes of describing the preferred embodiment, the terminology used in reference to the numbered components in the drawings is as follows:

| | |
|---|---|
| 10. | Jack Dolly |
| 12a, b. | Front Arm Members |
| 14a, b. | Collars |
| 16a, b. | Forks |
| 18a, b. | Bolts |

-continued

| | |
|---|---|
| 20a, b. | Axles |
| 22a, b. | Wheels |
| 24a, b. | Rods |
| 26. | Fastener |
| 28. | Springs |
| 30. | Rod |
| 32. | Sleeve |
| 34a, b. | Rear Arm Members |
| 36a, b. | Plates |
| 38 | Fastener |
| 40a, b. | Rods |
| 42a, b. | Axles |
| 44a, b. | Wheels |
| 46. | Bushing |
| 48. | Shaft |
| 50. | Hydraulic Automobile Jack |
| 54. | Handle |
| 56. | Rear Wheel |
| 58. | Front Wheel |
| 60. | Load Support Plate |
| 62. | Aperture |
| 64. | Rear Rod |
| 66. | Middle Rod |
| 68. | Front Rod |
| 70. | Springs |
| 72. | Springs |

Referring now to the drawings and, in particular, to FIG. 1 through FIG. 4 wherein there are illustrated a typical embodiment of the jack dolly 10, the jack dolly 10 is comprised of two elongate rectangular arm members 12a, b with cylindrical collars 14a, b that are attached to one end thereof. Wheel forks 16a, b are disposed in pivotal engagement within the interior of the collars 14a, b and secured thereto by bolts 18a, b. Axles 20a, are attached perpendicularly to the lower ends of the wheel forks 16a, b and wheels 22a, b are rotatingly attached to said axles 20a, b. Each wheel 22a, b is comprised of a rim, which is attached to a cooperating axle 20a, b, and an inflatable rubber tire. Rods 24a, b are affixed medially to the inside surfaces of the front arm members 12a, b and extend therefrom in perpendicular relation to the longitudinal axis of said arm members 12a, b. A fastener 26 located on the outside surface of each front arm member 12a, b secures the rods 24a, b to each front arm member 12a, b, respectively. Two springs 28 with hooked ends are attached at one end thereof to each rod 24a, b.

An elongate, cylindrical rod 30 with sleeves 32 is disposed within apertures located at the ends of the elongate front arm members 12a, b and through apertures located at cooperating ends of two elongate rectangular rear arm members 34a, b. Rectangular plates 36a, b are attached by fasteners 38 to the ends of the rear arm members 34a, b opposite to the ends thereof attached to the elongate cylindrical rod 30. Rods 40a, b are affixed to the top end of said plates 36a, b and extend therefrom in perpendicular relation to the longitudinal axis of said plates 36a, b. Axles 42a, b are affixed perpendicularly to the rear arm members 34a, b adjacent to the rectangular plates 36a, b. Wheels 44a, b are rotatingly attached to the axles 42a, b with each wheel 44a, b comprised of a rim, which is attached to a cooperating axle 42a, b, and an inflatable rubber tire.

As the cylindrical rod 30 and sleeves 32 are disposed within apertures at cooperating ends of the front 12a, b and rear 34a, b arm members, said front 12a, b arm members are pivotally attached to the rear 34a, b arm members and first cooperating front arm 12a and rear 34a arm members are aligned in parallel relation to second cooperating front arm 12b and rear 34b arm members.

Figure 5:
FIG. 5 is a partial cross sectional view of the collar assembly of the jack dolly of the present invention.

Referring to FIG. 5, therein illustrated in partial cross sectional view is a wheel fork 16a disposed within a cooperating collar 14a of a front arm member 12a. Circular bushings 46 are located at opposing ends of the collar 14a. A cylindrical shaft 48 is attached to the top end of the wheel fork 16a and is received within the collar 14a and bushings 46 and is attached to the collar 14a by the bolt 18a. In this manner, the wheel fork 16a by means of the shaft 48 can rotate with respect to the collar 14a.

Figure 6:
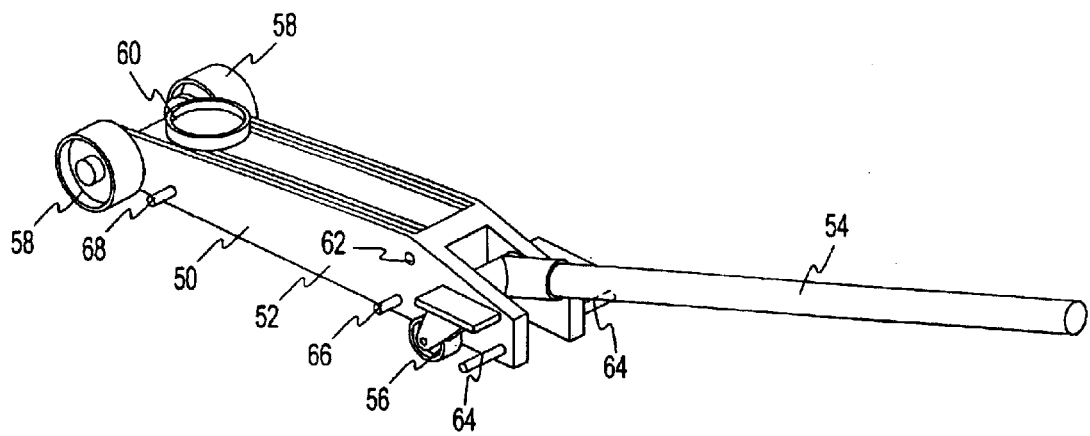
FIG. 6 is a perspective view of a hydraulic vehicle jack modified for use with the dolly and of the present invention.

A hydraulic vehicle jack 50 is displayed in FIG. 6 as having a rectangular body 52, pumping handle 54, rear caster wheels 56, front wheels 58, and load support plate 60. The jack 50 is modified with a pair of rear rods 64, middle rods 66, and front rods 68 attached to opposing lateral sidewalls of the jack body 52 and by an aperture bored through 62 located adjacent to the top edge of the body 52 in perpendicular relation to the longitudinal axis of said body 52.

Figure 7:
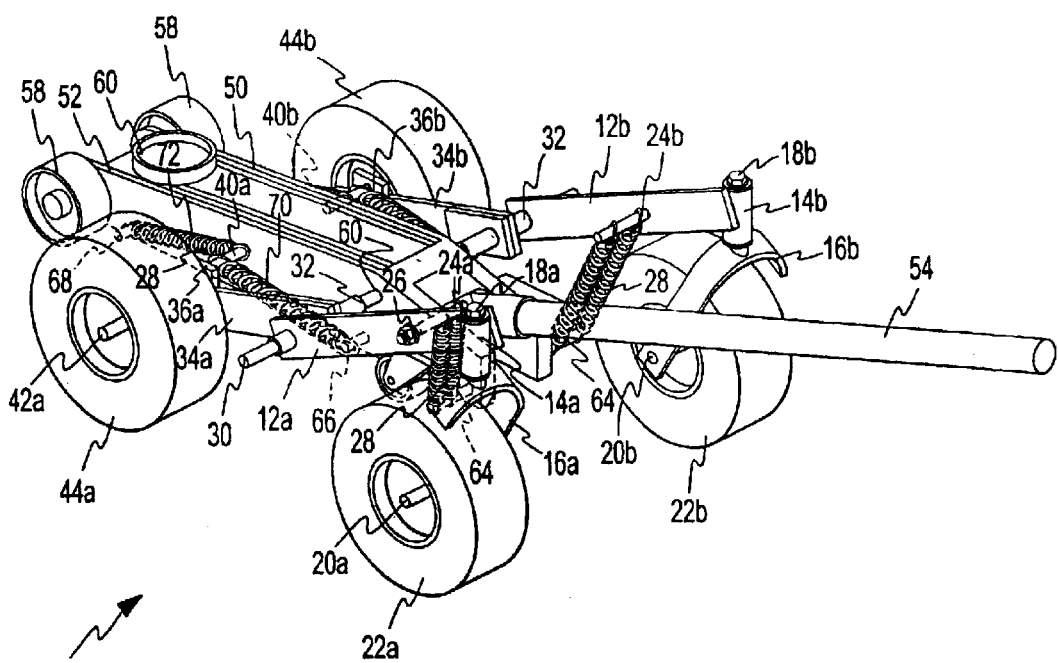
FIG. 7 is a perspective view of a the dolly of the present invention with the modified hydraulic vehicle jack secured thereto for transport.

As illustrated in FIG. 7 the modified hydraulic automobile jack 50 is releasably secured to the jack dolly 10 by inserting the elongate cylindrical rod 30 through the aperture 62 of the body 52 of the jack 50 so that the jack 50 is pivotally attached to said dolly 10 and suspended above a floor or ground support surface. The jack 50 is prevented from rotating excessively upon the rod 30 by springs 28, 70, 72 attached to the dolly 10 and jack 50. Four springs 28 are attached at a first end to rods 24a, b and at a second end to the rear rods 64 (shown in phantom line) extending from the body 52 of the jack 50. Two springs 70 are attached at a first end to rods 40a, b extending from plates 36a, b and at a second end to the middle rods 66 (shown in phantom line) extending from the jack body 52, and two springs 72 are attached at a first end to said rods 40a, b and at a second end to the front rods 68 (shown in phantom line) extending from said jack body 52. In this manner, the jack 50, secured to the jack dolly 10 as described can be wheeled about by the handle 54 to various locations and even into transport vehicles. In some cases, a pin or bolt can be inserted through an aperture located at the unattached end of the jack handle 54 for securing the jack 50 to the tow hitch of a vehicle for moving the jack 50 while said jack 50 is secured within the jack dolly 10.

While a preferred embodiment of the invention has been illustrated and described in detail in the drawings and foregoing description, the same is to be considered as illustrative and not restrictive in character, it being understood that only the preferred embodiment has been shown and described and that all changes and modifications that come within the spirit of the version of the invention are desired to be protected. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Having thus described my invention, I claim:

1. A dolly for transporting a hydraulic vehicle jack, said dolly comprising:

two elongate front arm members and two elongate rear arm members, each front arm member being pivotally attached to a cooperating end of a rear arm member by a rod disposed in apertures on the cooperating ends of the front and rear arm members;

a cylindrical collar attached to each front arm member opposite the cooperating end;

a wheel fork disposed in pivotal engagement within said collar;

an axle with a wheel rotatingly disposed on said axle affixed to a lower end of the fork;

a rod medially attached perpendicularly to an inside surface of each front arm member;

at least one spring secured at one end thereof to each rod;

an axle with a wheel rotatingly disposed on said axle extending from each rear arm member opposite the cooperating end of the rear arm member; and a plate with rod affixed thereto attached to an inside surface of each rear arm member adjacent to the axle thereof.

2. The dolly of claim 1 wherein the at least one spring comprises two springs on each rod.

3. A method for using a dolly to transport to a hydraulic vehicle jack, said jack having an elongated, rectangular body with opposing lateral side walls, a pair of wheels attached to a first end thereof and a second pair of wheels attached to an opposing end thereof and a elongate handle extending from the first end of the jack, said jack further being modified to include an aperture bored through a top of the body and three pairs of rods attached perpendicularly to an exterior surface near a forward, end, middle and rear on the opposing lateral side walls of the body of the jack and the dolly comprising two elongated front arm members and two elongated rear arm members, each front arm member being pivotally attached to a cooperating end of a rear arm member by a rod disposed in apertures on the cooperating ends of the front and rear arm members, a cylindrical collar attached to each front arm member opposite the cooperating end, a wheel fork disposed in pivotal engagement within said collar, a axle with a wheel rotatingly disposed on said axle affixed to a lower end of the fork, a rod medially attached perpendicularly to an inside surface of each front arm member, at least one springs secured at one end thereof to each rod; an axle with a wheel rotatingly disposed on said axle extending from each rear arm member opposite the cooperating end of the rear arm member and a plate with rod affixed thereto attached to an inside surface of each rear arm member adjacent to the axle thereof, said method comprising the steps of:

aligning the jack between the arm members of the dolly;

inserting each rod on each front arm member of the dolly through the aperture on the top of the jack;

attaching one end of the at least one spring to one rod on the plate of each rear arm member of the dolly and a second end of the at least one spring to each middle rod extending from the jack;

attaching a first end of the at least one other spring to each rod on the plate of each arm member to each front rod extending from the jack; and manipulating the handle of the jack to transport the jack to a desired location.

4. The method of claim 3 further comprising the further step of:

inserting a pin through an aperture located on an arm-attached to an end of the jack to a tow hitch of a vehicle while the jack is secured within the dolly for towing the dolly with the vehicle.

* * * * *